United States Patent [19]

Yuasa

[11] Patent Number: 4,467,384
[45] Date of Patent: Aug. 21, 1984

[54] PROTECTIVE DEVICE FOR DC REGULATED POWER SUPPLIES FOR SUPERCONDUCTING MAGNET COILS

[75] Inventor: Kazunori Yuasa, Hyogo, Japan

[73] Assignee: Mitsubishi Denki Kabushiki Kaisha, Tokyo, Japan

[21] Appl. No.: 465,411

[22] Filed: Feb. 10, 1983

[30] Foreign Application Priority Data

Feb. 10, 1982 [JP] Japan .................... 57-21501

[51] Int. Cl.³ ................ H02H 7/00; H01F 7/22
[52] U.S. Cl. .................. 361/19; 307/306; 307/245
[58] Field of Search .......... 361/19; 307/306, 245

[56] References Cited

U.S. PATENT DOCUMENTS

| | | | |
|---|---|---|---|
| 3,214,637 | 10/1965 | Persson | 361/19 |
| 3,304,466 | 2/1967 | Minnich et al. | 361/19 |
| 3,581,113 | 5/1971 | Kafka | 307/306 X |
| 3,711,744 | 1/1973 | Lvton, Jr. | 307/245 X |

FOREIGN PATENT DOCUMENTS 59703 5/1980 Japan .................... 361/19

OTHER PUBLICATIONS

Purcell, J. R., "Report on the Argonne National Laboratory 12-ft Hydrogen Bubble Chamber Magnet System," *Proceedings,* pp. 560–563, Oxford, 1967.

*Primary Examiner*—Patrick R. Salce
*Attorney, Agent, or Firm*—Sughrue, Mion, Zinn, Macpeak, and Seas

[57] ABSTRACT

A protective device for use with a DC regulated power supply for supplying DC current to a superconducting magnet coil includes a pair of flywheel diodes and a protective resistance connected in parallel with the superconducting magnet coil. When the DC regulated power supply malfunctions, the superconducting magnet coil is severed from the power supply, and the flywheel diodes take up the energy stored in the superconducting magnet coil to reduce the current flowing through the DC regulated power supply to zero instantaneously. When the superconducting magnet coil has a fault, the coil is separated from the DC regulated power supply, and the protective resistance takes up the energy stored in the superconducting magnet coil.

4 Claims, 3 Drawing Figures

PROTECTIVE DEVICE FOR DC REGULATED POWER SUPPLIES FOR SUPERCONDUCTING MAGNET COILS

BACKGROUND OF THE INVENTION

1. Field of the Invention

The present invention relates to a protective device for use with a superconducting magnet coil connected to a DC regulated power supply for protecting the superconducting magnet coil when the DC regulated power supply or the superconducting magnet coil is subjected to malfunction or failure.

2. Description of the Prior Art

FIG. 1 of the accompanying drawings illustrates one conventional protective device of the type described above. A DC regulated power supply 1 comprises a transformer 2, a rectifier 3, a DC filter 4, and a transistor 5. An AC breaker 6 serves to cut off the input current to the DC regulated power supply 1 upon a malfunction or failure thereof. A superconducting magnet coil 7, or a load, is connected to the DC regulated power supply 1 through a protective resistance 8 for protecting the superconducting magnet coil 7 upon malfunction or failure and a DC breaker 9 for cutting off the output current from the DC regulated power supply 1 when any malfunction occurs.

The operation of the prior protective device is as follows: When the DC regulated power supply 1 fails, due, for example, to malfunction of the rectifier 3 or the transistor 5, the input current to the DC regulated power supply 1 is cut off by the AC breaker 6. Electric energy stored in the superconducting magnet coil 7 is then consumed by the transistor 5. The DC current flowing through the malfunctioning area is reduced to zero in a short period of time without adversely affecting the superconducting magnet coil 7. Upon any malfunction of the superconducting magnet coil 7, both the AC and DC breakers 6 and 9 are energized to cut off the currents. Electric energy stored in the superconducting magnet coil 7 is then discharged into a closed circuit composed of the superconducting magnet coil 7 and the protective resistance 8, and is consumed by the protective resistance 8. Therefore, the DC current flowing through the superconducting magnet coil 7 falls instantaneously to zero, preventing the superconducting magnet coil 7 from more severe damage.

The prior protective device of the foregoing arrangement suffers from a problem when the DC regulated power supply 1 malfunctions, e.g., when the rectifier 3 or the transistor 5 fails. More specifically, upon such a malfunction, the energy stored in the superconducting magnet coil 7 is consumed by the transistor 5, and the DC current flowing through the faulty area is reduced to zero in a short interval of time, but not instantaneously. Such a time delay before the DC current is completely eliminated causes the malfunctioning area to be severely damaged and adversely affects the superconducting magnet coil.

One solution to the above shortcoming would be to actuate the AC and DC breakers 6, 9 simultaneously at the time of a fault in the DC regulated power supply 1. This would cut off the input current to the DC regulated power supply 1 and sever the superconducting magnet coil 7 from the DC regulated power supply 1, permitting the current flowing through the DC regulated power supply 1 to be zeroed instantaneously. Therefore, the stored energy in the superconducting magnet coil 7 could be consumed by the protective resistance 8, and the current through the superconducting magnet coil 7 could be eliminated momentarily.

Generally, liquid helium is employed for cooling the superconducting magnet coil 7. When the current flowing through the superconducting magnet coil 7 undergoes an abrupt change, the liquid helium is liable to evaporate into a gas phase no longer available for use. Therefore, it is not preferable in the protective device to abruptly vary the current flowing through the superconducting magnet coil 7 unless the superconducting magnet coil 7 itself has a fault or unless otherwise dictated by unavoidable circumstances.

Accordingly, the conventional protective device of FIG. 1 has the above-mentioned difficulty in that the DC breaker 9 cannot be actuated to separate the superconducting magnet coil 7 from the DC regulated power supply 1 when the latter suffers from a fault.

A similar prior art device is described in the Proceeding of the Second International Conference on Magnet Technology, Oxford, 1967, pp. 560-563. This device similarly includes a resistor connected in parallel with the magnet field coil and a switch connected between one side of the resistance and the power supply, such that the resistor absorbs the energy stored in the magnetic field when the switch is opened, entirely similarly to the device described above.

SUMMARY OF THE INVENTION

It is an object of the present invention to provide a protective device for protecting a superconducting magnet coil against adverse effects by reducing the DC current to zero instantly when the DC regulated power supply of the superconducting magnet coil is subjected to failure.

According to the present invention, a protective device for use with a DC regulated power supply for a superconducting magnet coil includes a pair of flywheel diodes and a second DC breaker for absorbing the energy stored in the superconducting magnet coil and instantly eliminating the current flowing through the DC regulated power supply when the latter suffers a failure. The protective device is capable of reducing the circuit current to zero instantaneously when the superconducting magnet coil fails as well as when the DC regulated power supply has a fault. The faulty area is prevented from spreading, and the superconducting magnet coil is freed from adverse effects.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
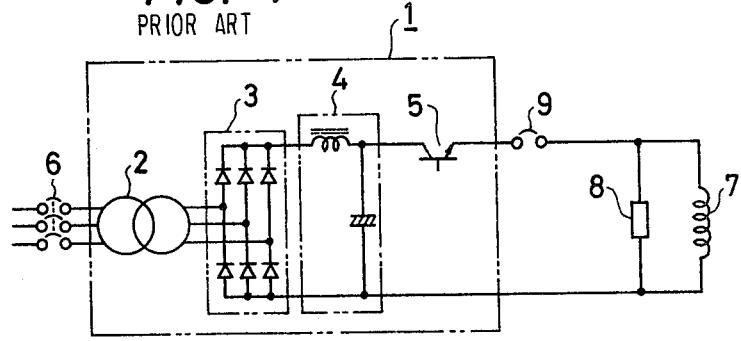
FIG. 1 is a circuit diagram of a conventional protective device for use with a DC regulated power supply of a superconducting magnet coil.
Figure 2:
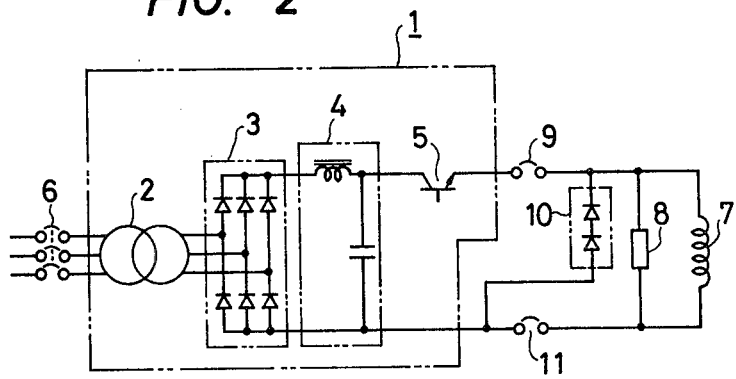
FIG. 2 is a circuit diagram of a protective device according to an embodiment of the present invention for use with a DC regulated power supply of a superconducting magnet coil.

A protective device according to one embodiment of the present invention will now be described with reference to FIG. 2. Identical reference numerals in FIG. 2 denote identical or corresponding parts of FIG. 1. The protective device includes a pair of series-connected flywheel diodes 10 connected in parallel with the superconducting magnet coil 7 for taking up the energy stored therein, and a second DC breaker 11 for severing the flywheel diodes 10 and the protective resistance 8 from one another upon a mulfunction or failure. The DC breaker 9 will hereinafter be referred to as the "first DC breaker" so as to distinguish it from the second DC breaker 11. The first DC breaker 9 is connected between one output terminal of the power supply 1 and a first junction at which the superconducting magnet coil 7 and the protective resistance 8 are interconnected at one terminal. The second DC breaker 11 is connected between the other output terminal of the power supply 1 and a second junction at which the superconducting magnet coil 7 and the protective resistance 8 are interconnected. The flywheel diodes 10 have one terminal coupled between the first DC breaker 9 and the first junction and the other terminal connected between the other output terminal of the power supply 1 and the second DC breaker 11.

The protective device shown in FIG. 2 will operate as follows: When the DC regulated power supply 1 fails, e.g., when the rectifier 8 or the transistor 5 malfunctions, the AC breaker 6 and the first DC breaker 9 are actuated to cut off the current. No input current is then supplied to the DC regulated power supply 1. Since the power supply is severed by the first DC breaker 9 from the superconducting magnet coil 7, the protective resistance 8 and the flywheel diodes 10, the DC current flowing through the faulty part is reduced to zero instantaneously. When the breakers 6, 9 are thus energized, the superconducting magnet coil 7 and the flywheel diodes 10 constitute a closed circuit allowing the electric energy stored in the superconducting magnet coil 7 to be consumed by the flywheel diodes 10. The DC current flowing through the superconducting magnet coil 7 is gradually reduced to zero, and thus the coil 7 is freed from and adverse effects due to the failure of the rectifier 3 or the transistor 5.

When the superconducting magnet coil 7 itself has a fault, the AC breaker 6, the first DC breaker 9 and the second DC breaker 11 are actuated to cut off the current. The superconducting magnet coil 7 and the protective resistance 8 now form a closed circuit, and the electric energy stored in the superconducting magnet coil 7 is consumed by the protective resistance 8. Therefore, the DC current flowing through the superconducting magnet coil 7 is reduced to zero, preventing the fault in the superconducting magnet coil 7 from spreading. This manner of protecting the superconducting magnet coil 7 against fault spreading is the same as that of the conventional arrangement.

When the flywheel diodes 10 suffer a failure, the AC breaker 6, the first DC breaker 9 and the second DC breaker 11 are energized as it is substantially impossible to protect the DC regulated power supply without adversely affecting the superconducting magnet coil 7, as when the superconducting magnet coil 7 fails. The energy stored in the superconducting magnet coil 7 is consumed by the protective resistance 8.

Figure 3:
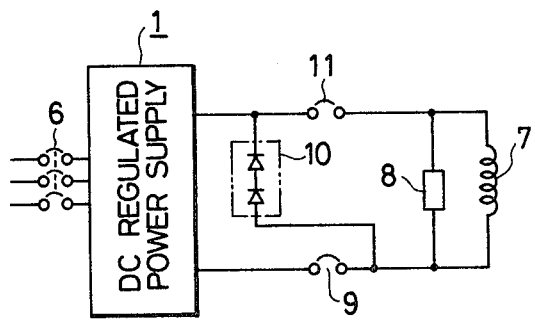
FIG. 3 is a circuit diagram of a protective device according to another embodiment of the present invention.

FIG. 3 shows a modified protective device in which the first DC breaker 9 is connected between one output terminal of the DC regulated power supply 1 and one of the flywheel diodes 10, and the second DC breaker 11 is connected between the other flywheel diode 10 and one terminal of the superconducting magnet coil 7. The device of this embodiment operates similarly to that described above.

Although certain preferred embodiments have been shown and described, it should be understood that many changes and modifications may be made therein without departing from the scope of the appended claims.

What is claimed is:

1. A protective circuit for use with a DC regulated power supply supplying DC current to a superconducting magnet coil, comprising:
   (a) an AC breaker connected to the DC regulated power supply for controlling an AC input current to the latter;
   (b) a resistance connected in parallel with the superconducting magnet coil for absorbing energy stored therein;
   (c) a first DC breaker for cutting off an output current from said DC regulated power supply;
   (d) flywheel diode means connected in parallel with the superconducting magnet coil for absorbing energy stored therein when said DC regulated power supply fails, said flywheel diode means and said superconducting magnet coil selectively forming a closed circuit; and
   (e) a second DC breaker for selectively making and breaking said closed circuit, such that upon failure of said DC regulated power supply, said AC breaker and said first DC breaker are energized to allow said flywheel diode means to absorb the energy stored in said superconducting magnet coil to thereby instantaneously reduce the current flowing through said DC regulated power supply, and such that when said superconducting magnet coil or said flywheel diode means fails, said AC breaker and said first and second DC breakers are energized to allow said resistance to absorb the energy stored in said superconducting magnet coil.

2. A protective device according to claim 1, wherein said DC regulated power supply has first and second output terminals, said superconducting magnet coil and said resistance being interconnected at a pair of first and second junctions connected respectively to said first and second output terminals, said first DC breaker being connected between said first output terminal and said first junction, and said second DC breaker being connected between said second output terminal and said second junction.

3. A protective device according to claim 2, wherein said flywheel diode means comprises a pair of flywheel diodes having a first terminal connected between said first DC breaker and said first junction, and a second terminal connected between said second output terminal of said DC regulated power supply and said second DC breaker.

4. A protective device according to claim 2, wherein said DC regulated power supply comprises a transformer connected to said AC breaker, a rectifier connected to said transformer, a DC filter connected to said recitifier, and a transistor connected between said DC filter and said first DC breaker.

* * * * *